United States Patent
Artemiev et al.

(10) Patent No.: US 10,859,518 B2
(45) Date of Patent: Dec. 8, 2020

(54) X-RAY ZOOM LENS FOR SMALL ANGLE X-RAY SCATTEROMETRY

(71) Applicant: KLA-Tencor Corporation, Milpitas, CA (US)

(72) Inventors: Nikolay Artemiev, Berkeley, CA (US); Michael Friedmann, Mountain View, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 193 days.

(21) Appl. No.: 15/847,375

(22) Filed: Dec. 19, 2017

(65) Prior Publication Data

US 2018/0188192 A1    Jul. 5, 2018

Related U.S. Application Data

(60) Provisional application No. 62/441,707, filed on Jan. 3, 2017.

(51) Int. Cl.
*G01N 23/201* (2018.01)

(52) U.S. Cl.
CPC ... *G01N 23/201* (2013.01); *G01N 2223/1016* (2013.01); *G01N 2223/6116* (2013.01)

(58) Field of Classification Search
CPC ... G01N 2223/1016; G01N 2223/6116; G01N 23/201; G01N 15/0211; G01N 23/2055; G01N 23/2076; G01N 23/22; G01N 23/223; G21K 1/06; G21K 2201/061; G21K 2201/062; G21K 2201/064;
(Continued)

(56) References Cited

U.S. PATENT DOCUMENTS

| | | | |
|---|---|---|---|
| 5,608,526 A | 3/1997 | Piwonka-Corle et al. |
| 5,859,424 A | 1/1999 | Norton et al. |

(Continued)

FOREIGN PATENT DOCUMENTS

| | | |
|---|---|---|
| EP | 1617210 B1 | 2/2009 |
| JP | 03-082943 A | 4/1991 |
| WO | 2016103834 A1 | 6/2016 |

OTHER PUBLICATIONS

International Search Report dated Jun. 15, 2018, for PCT Application No. PCT/US2018/012086 filed on Jan. 2, 2018, by KLA-Tencor Corporation, 3 pages.

(Continued)

*Primary Examiner* — Irakli Kiknadze
(74) *Attorney, Agent, or Firm* — Spano Law Group; Joseph S. Spano

(57) ABSTRACT

Methods and systems for controlling illumination beam spot size for Transmission, Small-Angle X-ray Scatterometry (T-SAXS) measurements of different sized metrology targets are described herein. An X-ray illumination optics subsystem includes one or more focusing optical elements with object and image planes at fixed locations and one or more illumination apertures or slits that independently control magnification and beam divergence. In a further aspect, the illumination source size and shape is controlled, along with magnification and beam divergence. In this manner, beam divergence and illumination spot size on a specimen are independently controlled, while maintaining constant illumination flux.

25 Claims, 7 Drawing Sheets

(58) Field of Classification Search
CPC ...... G21K 2201/067; G21K 1/02; G21K 1/04; G21K 1/062; H02J 3/008
USPC .......................................... 378/70–83, 86–90
See application file for complete search history.

(56) References Cited

U.S. PATENT DOCUMENTS

| | | | |
|---|---|---|---|
| 6,023,338 | A | 2/2000 | Bareket |
| 6,249,566 | B1 | 6/2001 | Hayashi et al. |
| 6,429,943 | B1 | 8/2002 | Opsal et al. |
| 6,504,902 | B2 | 1/2003 | Iwasaki et al. |
| 6,716,646 | B1 | 4/2004 | Wright et al. |
| 6,778,275 | B2 | 8/2004 | Bowes |
| 6,787,773 | B1 | 9/2004 | Lee |
| 6,992,764 | B1 | 1/2006 | Yang et al. |
| 7,072,442 | B1 * | 7/2006 | Janik ................. G21K 1/06 378/145 |
| 7,110,491 | B2 * | 9/2006 | Mazor .............. G01N 23/20 378/71 |
| 7,242,477 | B2 | 7/2007 | Mieher et al. |
| 7,245,699 | B2 | 7/2007 | Verman et al. |
| 7,321,426 | B1 | 1/2008 | Poslaysky et al. |
| 7,406,153 | B2 | 7/2008 | Berman |
| 7,478,019 | B2 | 1/2009 | Zangooie et al. |
| 7,626,702 | B2 | 12/2009 | Ausschnitt et al. |
| 7,646,849 | B2 | 1/2010 | Iwasaki et al. |
| 7,656,528 | B2 | 2/2010 | Abdulhalim et al. |
| 7,706,503 | B2 | 4/2010 | Jiang |
| 7,809,108 | B1 | 10/2010 | Storm et al. |
| 7,826,071 | B2 | 11/2010 | Shchegrov et al. |
| 7,842,933 | B2 | 11/2010 | Shur et al. |
| 7,873,585 | B2 | 1/2011 | Izikson |
| 7,920,676 | B2 | 4/2011 | Yun et al. |
| 7,929,667 | B1 | 4/2011 | Zhuang et al. |
| 7,933,026 | B2 | 4/2011 | Opsal et al. |
| 8,068,662 | B2 | 11/2011 | Zhang et al. |
| 8,138,498 | B2 | 3/2012 | Ghinovker |
| 10,302,579 | B2 * | 5/2019 | Omote ................ G01N 23/223 |
| 2002/0070355 | A1 * | 6/2002 | Ota .................... G03F 7/70358 250/492.2 |
| 2003/0021465 | A1 | 1/2003 | Adel et al. |
| 2006/0108534 | A1 | 5/2006 | Kerpershoek |
| 2007/0221842 | A1 | 9/2007 | Morokuma et al. |
| 2009/0152463 | A1 | 6/2009 | Toyoda et al. |
| 2011/0266440 | A1 | 11/2011 | Boughorbel et al. |
| 2012/0292502 | A1 | 11/2012 | Langer et al. |
| 2013/0208279 | A1 | 8/2013 | Smith |
| 2013/0304424 | A1 | 11/2013 | Bakeman et al. |
| 2014/0019097 | A1 | 1/2014 | Bakeman et al. |
| 2014/0111791 | A1 | 4/2014 | Manassen et al. |
| 2014/0172394 | A1 | 6/2014 | Kuznetsov et al. |
| 2014/0222380 | A1 | 8/2014 | Kuznetsov et al. |
| 2014/0297211 | A1 | 10/2014 | Pandev et al. |
| 2015/0003592 | A1 * | 1/2015 | Beckers ........... G01N 23/20008 378/74 |
| 2015/0110249 | A1 | 4/2015 | Bakeman et al. |
| 2015/0117610 | A1 | 4/2015 | Veldman et al. |
| 2015/0300965 | A1 | 10/2015 | Sezginer et al. |
| 2017/0307548 | A1 | 10/2017 | Bykanov et al. |

OTHER PUBLICATIONS

Montel, M., "X-ray microscopy with catamegonic roof mirrors, X-ray microscopy and microradiography," Academic Press, New York, pp. 177-185, 1957.
Kirkpatrick, P. and Baez, A.V., "Formation of optical images by X-rays," Journal Opt. Soc. Am., vol. 38, pp. 766-774, 1948.

* cited by examiner

X-RAY ZOOM LENS FOR SMALL ANGLE X-RAY SCATTEROMETRY

CROSS REFERENCE TO RELATED APPLICATION

The present application for patent claims priority under 35 U.S.C. § 119 from U.S. provisional patent application Ser. No. 62/441,707, filed Jan. 3, 2017, the subject matter of which is incorporated herein by reference in its entirety.

TECHNICAL FIELD

The described embodiments relate to x-ray metrology systems and methods, and more particularly to methods and systems for improved measurement accuracy.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. A number of metrology based techniques including scatterometry and reflectometry implementations and associated analysis algorithms are commonly used to characterize critical dimensions, film thicknesses, composition and other parameters of nanoscale structures.

Traditionally, scatterometry critical dimension measurements are performed on targets consisting of thin films and/or repeated periodic structures. During device fabrication, these films and periodic structures typically represent the actual device geometry and material structure or an intermediate design. As devices (e.g., logic and memory devices) move toward smaller nanometer-scale dimensions, characterization becomes more difficult. Devices incorporating complex three-dimensional geometry and materials with diverse physical properties contribute to characterization difficulty. For example, modern memory structures are often high-aspect ratio, three-dimensional structures that make it difficult for optical radiation to penetrate to the bottom layers. Optical metrology tools utilizing infrared to visible light can penetrate many layers of translucent materials, but longer wavelengths that provide good depth of penetration do not provide sufficient sensitivity to small anomalies. In addition, the increasing number of parameters required to characterize complex structures (e.g., FinFETs), leads to increasing parameter correlation. As a result, the parameters characterizing the target often cannot be reliably decoupled with available measurements.

In one example, longer wavelengths (e.g. near infrared) have been employed in an attempt to overcome penetration issues for 3D FLASH devices that utilize polysilicon as one of the alternating materials in the stack. However, the mirror like structure of 3D FLASH intrinsically causes decreasing light intensity as the illumination propagates deeper into the film stack. This causes sensitivity loss and correlation issues at depth.

In another example, opaque, high-k materials are increasingly employed in modern semiconductor structures. Optical radiation is often unable to penetrate layers constructed of these materials. As a result, measurements with thin-film scatterometry tools such as ellipsometers or reflectometers are becoming increasingly challenging.

In response to these challenges, more complex optical metrology tools have been developed. For example, tools with multiple angles of illumination, shorter illumination wavelengths, broader ranges of illumination wavelengths, and more complete information acquisition from reflected signals (e.g., measuring multiple Mueller matrix elements in addition to the more conventional reflectivity or ellipsometric signals) have been developed. However, these approaches have not reliably overcome fundamental challenges associated with measurement of many advanced targets (e.g., complex 3D structures, structures smaller than 10 nm, structures employing opaque materials) and measurement applications (e.g., line edge roughness and line width roughness measurements).

Atomic force microscopes (AFM) and scanning-tunneling microscopes (S™) are able to achieve atomic resolution, but they can only probe the surface of the specimen. In addition, AFM and S™ microscopes require long scanning times. Scanning electron microscopes (SEM) achieve intermediate resolution levels, but are unable to penetrate structures to sufficient depth. Thus, high-aspect ratio holes are not characterized well. In addition, the required charging of the specimen has an adverse effect on imaging performance. X-ray reflectometers also suffer from penetration issues that limit their effectiveness when measuring high aspect ratio structures.

To overcome penetration depth issues, traditional imaging techniques such as TEM, SEM etc., are employed with destructive sample preparation techniques such as focused ion beam (FIB) machining, ion milling, blanket or selective etching, etc. For example, transmission electron microscopes (TEM) achieve high resolution levels and are able to probe arbitrary depths, but TEM requires destructive sectioning of the specimen. Several iterations of material removal and measurement generally provide the information required to measure the critical metrology parameters throughout a three dimensional structure. But, these techniques require sample destruction and lengthy process times. The complexity and time to complete these types of measurements introduces large inaccuracies due to drift of etching and metrology steps. In addition, these techniques require numerous iterations which introduce registration errors.

Transmission, Small-Angle X-Ray Scatterometry (T-SAXS) systems have shown promise to address challenging measurement applications. However, imaging a finite sized x-ray source onto the wafer under measurement remains challenging, particularly for small metrology targets and metrology targets of varying size.

Available x-ray sources have a finite dimension in directions orthogonal to the direction of beam propagation. Moreover, the X-ray flux emitted by an X-ray source is proportional to the source size. Due to finite source size, the beam spot incident on the specimen is defined by the source size and magnification of the optical scheme. The magnification of the optics is the ratio of the distance from the focusing optic to the image and the distance from the focusing optic to the source. A critical challenge is to enable variable magnification to accommodate different sized metrology targets, while maximizing photon flux through the target.

Many existing grazing incidence optical systems employ focusing optics of fixed shape that provide constant magnification or variable shape that provide variable magnification. Beam divergence is controlled either by varying a beam slit size behind the focusing optics, varying the shape of the focusing optics, or both.

In some examples, focused beam size is controlled with different focusing optics having different magnifications. In other words, beam size at focus and magnification are effectively coupled, and a change in magnification requires a change of optical elements. The need to replace optics and related hardware every time a different magnification is required is impractical in a semiconductor fabrication setting. Furthermore, a change of optics with different magnification necessitates a change of source-to-optic distance, optic-to-focus distance, or both. In practice, this requires a physical relocation of any of the optic with respect to the source, the optic with respect to the sample, and a relocation of the sample with respect to the optic and source. The need to physically relocate optics, source, and sample with respect to one another is highly undesirable in a semiconductor fabrication setting. U.S. Pat. Nos. 6,249,566 and 6,504,902 describe systems with these characteristics in further detail, the contents of which are incorporated herein by reference in their entirety.

In some examples, beam divergence is controlled by an exit aperture or slit with variable size located near the exit aperture of the focusing optic. However, this approach comes at a cost of reduced flux on the sample. U.S. Pat. No. 7,245,699 describes systems with this characteristic in further detail, the contents of which are incorporated herein by reference in their entirety.

In some examples, a change in magnification is achieved by changing the geometrical shape of the focusing optics to change the focal distance. Unfortunately, this approach requires a change in target position relative to the optics and source, which is undesirable in a semiconductor fabrication setting. In addition, the amount of achievable change of geometrical shape is quite limited. Thus, the range of magnification that can be achieved for a small focus size system is quite small. Moreover, the feasibility and accuracy of geometric shaping and application of reflective coatings to surfaces undergoing shape change may be very limited. U.S. Pat. No. 7,706,503 describes systems with this characteristic in further detail, the contents of which are incorporated herein by reference in their entirety.

To further improve device performance, the semiconductor industry continues to focus on vertical integration, rather than lateral scaling. Thus, accurate measurement of complex, fully three dimensional structures is crucial to ensure viability and continued scaling improvements. Future metrology applications present challenges for metrology due to increasingly small resolution requirements, multi-parameter correlation, increasingly complex geometric structures including high aspect ratio structures, and increasing use of opaque materials. Thus, methods and systems for improved T-SAXS measurements are desired.

SUMMARY

Methods and systems for controlling illumination beam spot size for Transmission, Small-Angle X-ray Scatterometry (T-SAXS) measurements of different sized metrology targets are described herein. In one aspect, an X-ray illumination optics subsystem includes one or more focusing optical elements with object and image planes in fixed locations and one or more apertures or slits that independently control beam size and beam divergence on the target. In a further aspect, the illumination source size and shape is controlled, along with magnification and consequently beam size on the target. In this manner, illumination spot size on a wafer and beam divergence are independently controlled, while providing the highest possible illumination flux at the wafer.

For a given beam divergence and brightness of the illumination source, the highest achievable photon flux through targets of different size and shape is provided by variation of magnification and the source size and shape. In some embodiments, the illumination source size is controlled to maintain constant illumination beam spot size at the specimen over a wide range of optical magnifications. In some other embodiments, the illumination source size and optical magnification are controlled to adjust the illumination beam spot size at the specimen to match the available measurement area associated with a particular metrology target and to provide the highest achievable illumination photon flux.

In a further aspect, T-SAXS measurements are performed over a range of angles of incidence that provide sufficient resolution and depth of penetration to characterize high aspect ratio structures through their entire depth.

In another further aspect, a metrology system is configured to generate a structural model (e.g., geometric model, material model, or combined geometric and material model) of a measured structure of a specimen, generate a T-SAXS response model that includes at least one geometric parameter from the structural model, and resolve at least one specimen parameter value by performing a fitting analysis of measurement data with the response model. In this manner, a comparison of simulated T-SAXS signals with measured data enables the determination of geometric as well as material properties such as electron density and elemental identification and composition of the sample.

In another further aspect, T-SAXS measurement data is used to generate an image of a measured structure based on the measured intensities of the detected diffraction orders. In some embodiments, a response function model is generalized to describe the scattering from a generic electron density mesh. Matching this model to the measured signals, while constraining the modelled electron densities in this mesh to enforce continuity and sparse edges, provides a three dimensional image of the sample.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Practical T-SAXS measurements in a semiconductor manufacturing environment require measurements of different sized metrology targets with varying diffraction characteristics. In some examples, a metrology target characterized by T-SAXS measurements as described herein is located within a scribe line of a wafer under measurement. In these examples, the metrology target is sized to fit within the width of the scribe line. In some examples, the scribe line width is less than eighty micrometers. In some examples, the scribe line is less than fifty micrometers. In general, the width of the scribe lines employed in semiconductor manufacturing is trending smaller. In some examples, the metrology target characterized by T-SAXS measurements as described herein is located within an active die area of the wafer under measurement and is a part of a functional integrated circuit (e.g., memory, image sensor, logic device, etc.).

In general, it is preferred that the illumination beam spot size closely match the lateral dimensions of the metrology target under measurement to minimize contamination signals from structures surrounding the metrology target under measurement.

Methods and systems for controlling illumination beam spot size for Transmission, Small-Angle X-ray Scatterometry (T-SAXS) measurements of different sized metrology targets are described herein.

In one aspect, an X-ray illumination optics subsystem includes one or more focusing optical elements with object and image planes in fixed locations and one or more illumination apertures or slits that independently control magnification and beam divergence. The focusing optic includes one or more reflecting surfaces each having a constant geometrical shape.

In a further aspect, the illumination source size and shape is controlled, along with one or more illumination apertures, to independently control illumination spot size on a wafer and beam divergence, while maintaining illumination flux approximately constant at the wafer.

Figure 1:
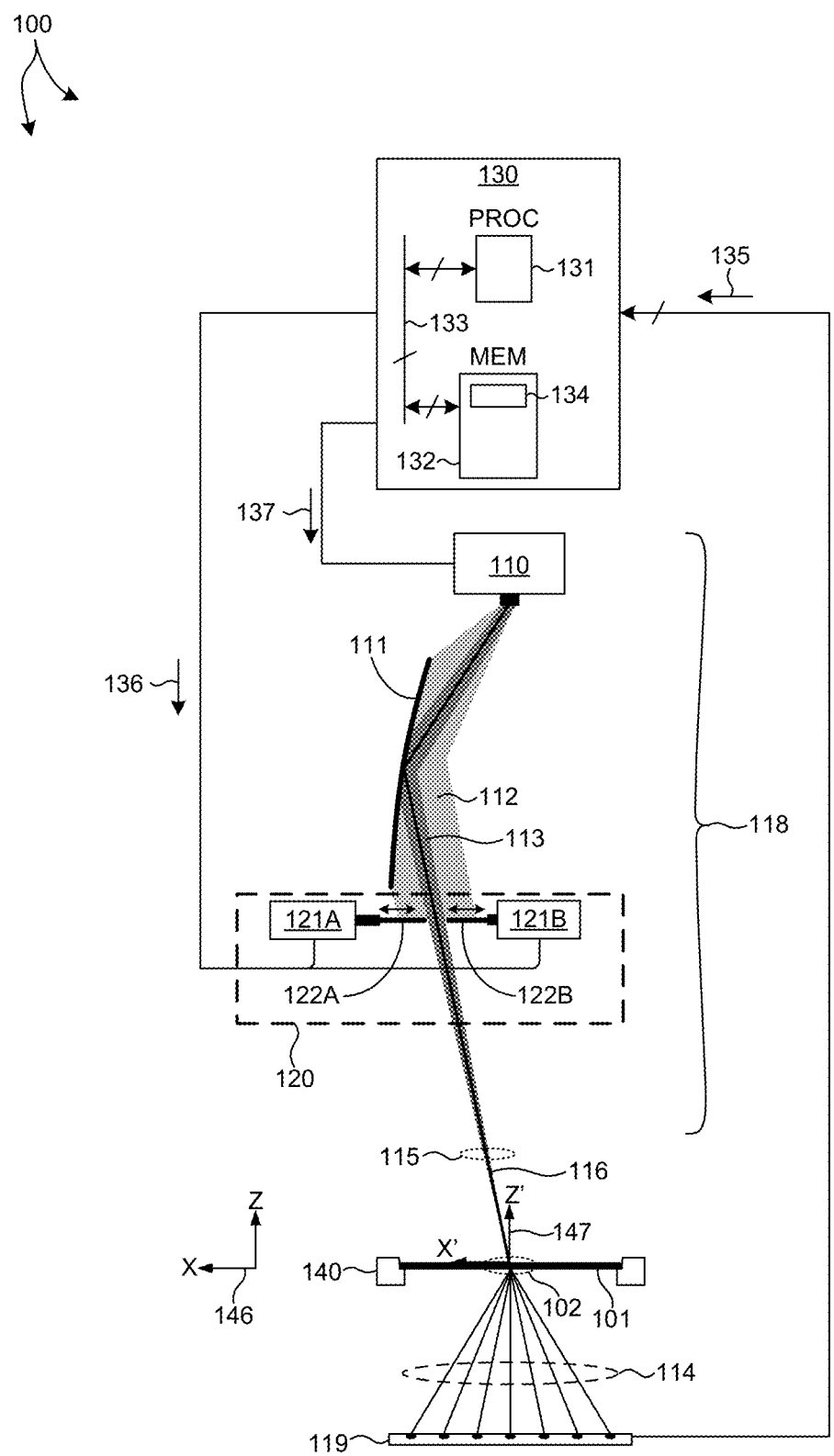
FIG. 1 is a diagram illustrative of a metrology system 100 with adjustable magnification and beam divergence in at least one novel aspect.

FIG. 1 illustrates an embodiment of a T-SAXS metrology tool 100 for measuring characteristics of a specimen in accordance with the exemplary methods presented herein. As shown in FIG. 1, the system 100 may be used to perform T-SAXS measurements over an inspection area 102 of a specimen 101 illuminated by a focused beam.

In the depicted embodiment, metrology tool 100 includes an x-ray illumination source 110 configured to generate x-ray radiation suitable for T-SAXS measurements. In some embodiments, the x-ray illumination system 110 is configured to generate wavelengths between 0.01 nanometers and 1 nanometer. In general, any suitable high-brightness x-ray illumination source capable of generating high brightness x-rays at flux levels sufficient to enable high-throughput, inline metrology may be contemplated to supply x-ray illumination for T-SAXS measurements. In some embodiments, an x-ray source includes a tunable monochromator that enables the x-ray source to deliver x-ray radiation at different, selectable wavelengths.

In some embodiments, one or more x-ray sources emitting radiation with photon energy greater than 15 keV are employed to ensure that the x-ray source supplies light at wavelengths that allow sufficient transmission through the entire device as well as the wafer substrate. By way of non-limiting example, any of a particle accelerator source, a liquid metal jet source, a rotating anode source, a stationary, solid anode source, a microfocus source, a microfocus rotating anode source, and an inverse Compton source may be employed as x-ray source 110. In one example, an inverse Compton source available from Lyncean Technologies, Inc., Palo Alto, Calif. (USA) may be contemplated. Inverse Compton sources have an additional advantage of being able to produce x-rays over a range of photon energies, thereby enabling the x-ray source to deliver x-ray radiation at different, selectable wavelengths.

Exemplary x-ray sources include electron beam sources configured to bombard solid or liquid targets to stimulate x-ray radiation. Methods and systems for generating high brightness, liquid metal x-ray illumination are described in U.S. Pat. No. 7,929,667, issued on Apr. 19, 2011, to KLA-Tencor Corp., the entirety of which is incorporated herein by reference.

An x-ray illumination subsystem includes illumination source 110, one or more focusing optical elements 111, and one or more sets of apertures or slits, that shape and direct an x-ray beam to specimen 101. As depicted in FIG. 1, x-ray illumination source 110 produces x-ray emission over a source area having finite lateral dimensions (i.e., non-zero dimensions orthogonal to the beam axis). Focusing optical element 111 focuses source radiation onto specimen 101 over an illumination area 102 defined by the incidence of x-ray illumination beam 115 on specimen 101.

In one aspect, an X-ray illumination optical subsystem includes one or more focusing optical elements and one or more illumination apertures or slits that independently control magnification and beam divergence. The focusing optic includes one or more reflecting surfaces each having a constant geometrical shape.

In a further aspect, the illumination source size and shape is controlled, along with one or more illumination apertures, to independently control illumination spot size on a wafer and beam divergence, while maintaining illumination flux approximately constant at the wafer.

Illumination subsystem 118 depicted in FIG. 1 provides an x-ray illumination beam 115 to specimen 101 with controllable divergence, focus size, and shape. The reflecting surface(s) of focusing optical element(s) 111 belong to the same focusing geometrical shape(s) such that the object and image planes of the focusing optical elements are in fixed locations for the entire workable range of the reflecting surfaces. Beam selection subsystem 120 is located in close proximity to focusing optic 111 and selects a portion of the illumination beam 112 reflected from focusing optic 111 and thereby controls the magnification of illumination subsystem 118 and the divergence of the illumination beam 115.

In the embodiment depicted in FIG. 1, beam selection subsystem 120 includes blade 122A and blade 122B. Blades 122A and 122B are independently positioned with respect to illumination beam 112 reflected from focusing optic 111 by actuators 121A and 121B, respectively. The position of blades 122A and 122B with respect to each other (i.e., gap between blades 122A and 122B) within the field of illumination beam 112 controls the divergence of illumination beam 115. The position of blades 122A and 122B with respect to illumination beam 112 in a direction perpendicular to a central axis of illumination subsystem 118 (i.e., location of the gap with respect to the reflected beam 112 in the plane defined by incident and reflected beams 112) controls the magnification of illumination subsystem 118.

Figure 2:
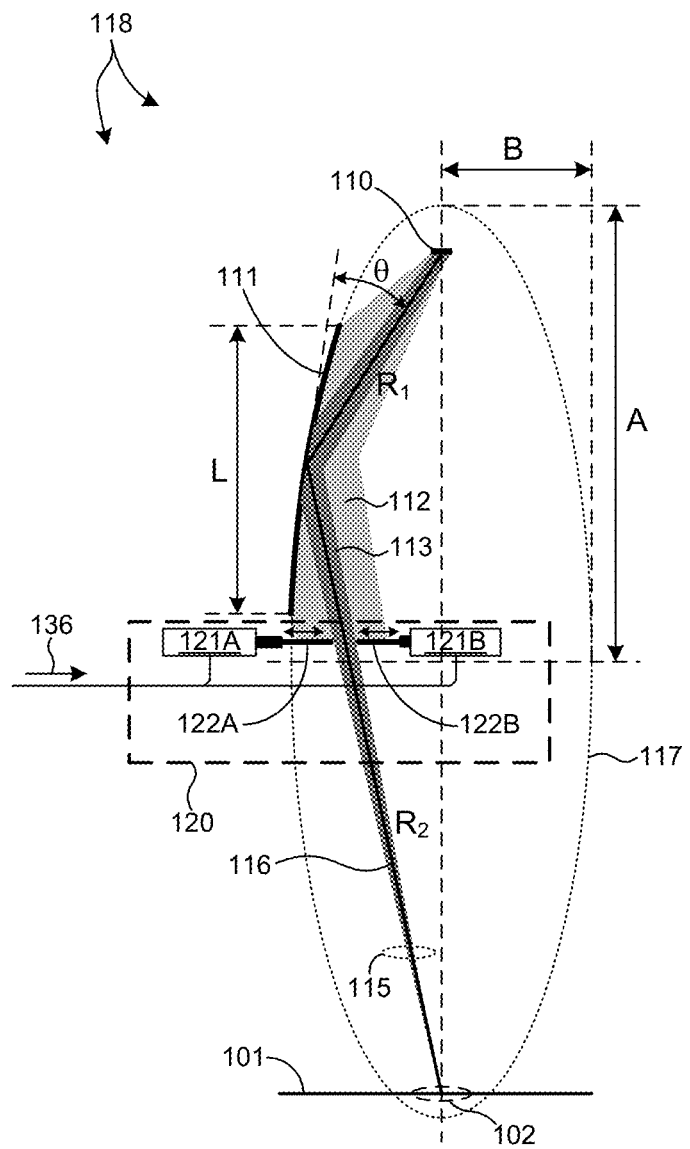
FIG. 2 depicts illumination subsystem 118 of metrology system 100 in an operational scenario where the selected portion of the illumination beam is incident at the middle of a focusing optical element.

FIG. 2 depicts illumination subsystem 118 of metrology system 100 in further detail. As depicted in FIG. 2, focusing optical element 111 is elliptically shaped. The reflecting surface of focusing optical element 111 tracks the shape of ellipse 117 having a semi-major axis length, A, and a semi-minor axis length, B. The reflecting surfaces of focusing optical element 111 are characterized by a length, L. Illumination source 110 and specimen 101 are located at the object and image planes, respectively, of focusing optical element 111, which coincide with the foci of ellipse 117. In some embodiments, the ratio A/B is any value between 50 and 250.

As depicted in FIG. 2, blades 122A and 122B are positioned such that a portion 113 of the illumination beam 112 reflected from focusing optical element 111 is selected as illumination beam 115 incident on specimen 101. The chief ray 116 of the selected portion 113 is also depicted. Chief ray 116 is incident on the reflecting surface of focusing optical element 111 at grazing incidence angle, $\theta$. $R_1$ is the distance between illumination source 110 and the point of incidence of chief ray 116 on focusing optical element 111. $R_2$ is the distance between the point of incidence of chief ray 116 on focusing optical element 111 and the point of incidence of chief ray 116 on specimen 101.

Figure 3:
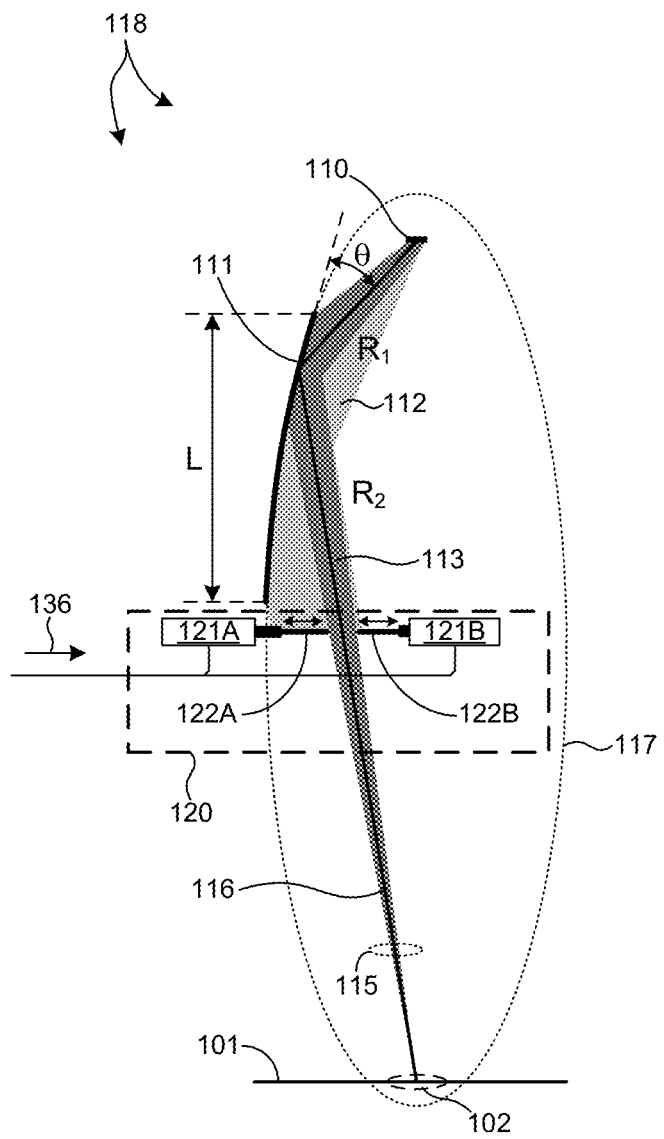
FIG. 3 depicts illumination subsystem 118 of metrology system 100 in an operational scenario where the selected portion of the illumination beam is incident at the front end of a focusing optical element.
Figure 4:
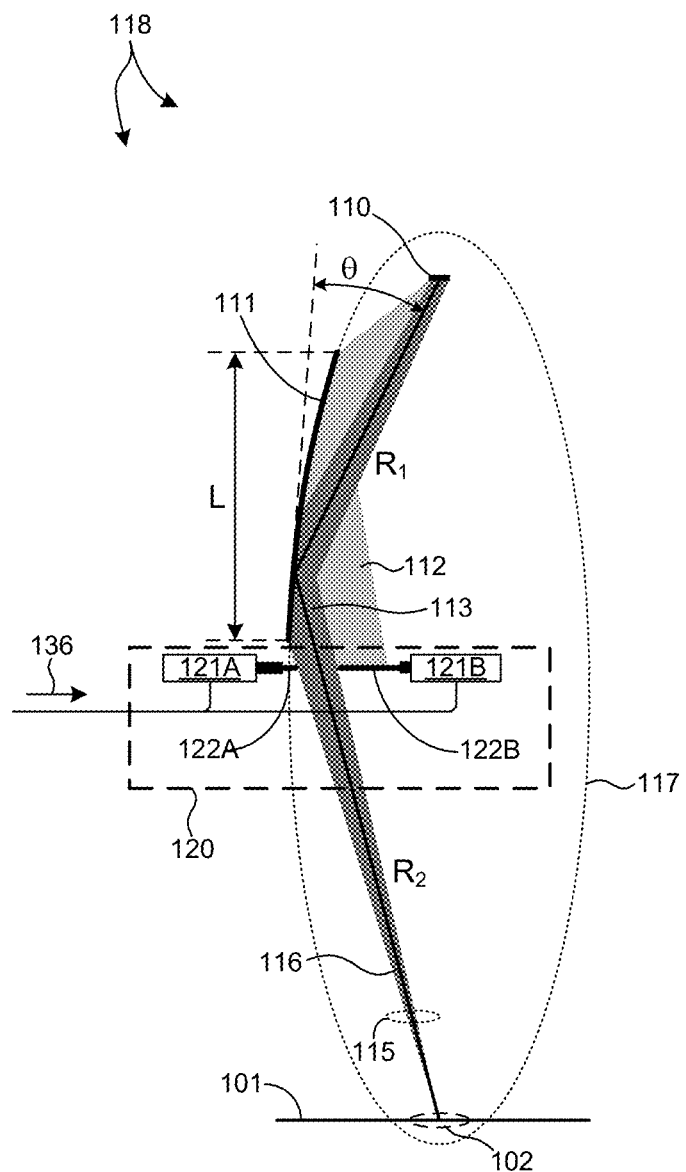
FIG. 4 depicts illumination subsystem 118 of metrology system 100 in an operational scenario where the selected portion of the illumination beam is incident at the back end of a focusing optical element.

FIGS. 3 and 4 depict illumination subsystem 118 of metrology system 100 in further detail. FIGS. 3 and 4 are similar to FIG. 2, except the selected portion 113 of the illumination beam 112 reflected from focusing optical element 111 is different.

As depicted in FIG. 2, blade elements 122A and 122B are positioned such that the chief ray 116 of the selected portion 113 of the illumination beam 112 reflects from the mid-point (i.e., L/2) of focusing optical element 111. As depicted in FIG. 3, blade elements 122A and 122B are positioned such that the chief ray 116 of the selected portion 113 of the illumination beam 112 reflects from the front end of focusing optical element 111 (i.e., the portion of focusing optical element 111 closest to illumination source 110). As depicted in FIG. 4, blade elements 122A and 122B are positioned such that the chief ray 116 of the selected portion 113 of the illumination beam 112 reflects from the back end of focusing optical element 111 (i.e., the portion of focusing optical element 111 furthest from illumination source 110).

The optical magnification of illumination subsystem 118 is defined by the ratio of $R_1$ and $R_2$. As depicted in FIGS. 2-4, the ratio of $R_1$ and $R_2$, and hence the optical magnification of the illumination system, differs depending on the portion 113 of the illumination beam 112 selected as illumination beam 115 incident on specimen 101. More specifically, as the location of incidence of the chief ray 116 on the focusing optical element 111 changes, so does the optical magnification of illumination subsystem 118.

The selection depicted in FIG. 3 provides the highest magnification for a given divergence of the reflected beam. Blades 122A and 122B are positioned such that only illumination light reflected from the front end of focusing optical element 111 forms illumination beam 115 incident on specimen 101. The selection depicted in FIG. 2 provides the medium magnification for a given divergence of the reflected beam. Blades 122A and 122B are positioned such that only illumination light reflected from the middle of focusing optical element 111 forms illumination beam 115 incident on specimen 101. The selection depicted in FIG. 4 provides the least magnification for a given divergence of the reflected beam. Blades 122A and 122B are positioned such that only illumination light reflected from the back end of focusing optical element 111 forms illumination beam 115 incident on specimen 101.

FIGS. 1-4 depict a beam selection subsystem 120 having one or more blades located between focusing optical element 111 and specimen 101. However, in general, a beam selection subsystem 120 may include one or more blades located between focusing optical element 111 and specimen 101, between illumination source 110 and focusing optical element 111, or both. The blades are located in close proximity to focusing optical element 111 (i.e., closer to focusing optical element 111 than either illumination source 110 or specimen 101). Furthermore, FIGS. 1-4 depict a beam selection subsystem 120 having one or more blades that define a slit that forms illumination beam 115. However, in general, beam selection subsystem 120 may include any suitable beam blocking elements to realize a moveable slit or aperture that controls the selection of the portion 113 of illumination beam 112 that forms illumination beam 115 incident on specimen 101 as described herein.

As described hereinbefore, the optical magnification of illumination subsystem 118 is defined by the ratio of $R_1$ and $R_2$. The nominal magnification, $M_{NOM}$ is defined by $R_{1NOM}$ and $R_{2NOM}$ as described by equation (1). $R_{1NOM}$ and $R_{2NOM}$ are the values of $R_1$ and $R_2$, respectively, when the chief ray of the selected illumination beam is incident at the middle of the focusing optical element (e.g., the scenario illustrated in FIG. 2).

$$M_{NOM} = \frac{R_{2NOM}}{R_{1NOM}} \quad (1)$$

Assuming a small grazing incidence angle (e.g., $\theta$ on the order of, or less than, a few degrees), the maximum achievable magnification, $M_{MAX}$, is defined by equation (2) and the minimum achievable magnification, $M_{MIN}$, is defined by equation (3).

$$M_{MAX} = \frac{R_{2NOM} + \frac{L}{2}}{R_{1NOM} - \frac{L}{2}} \quad (2)$$

$$M_{MIN} = \frac{R_{2NOM} - \frac{L}{2}}{R_{1NOM} + \frac{L}{2}} \quad (3)$$

As illustrated by equations (1)-(3), the longer the length of focusing optical element 111, the larger the range of magnifications. In addition, the ratio of the length of the focusing optical element, L, to $R_{1NOM}$ determines the magnitude of achievable magnification. In some embodiments, the nominal magnification is approximately three and the ratio $L/R_{1NOM}$ is approximately 3/4. In these embodiments, achievable magnification varies from approximately 1.9 to 5.4. In some embodiments, the distance between illumination source 110 and the closest point on the reflecting surface of focusing optical element 111 is at least fifty millimeters.

In some embodiments, the length of focusing optical element 111 is approximately 200 millimeters and $R_{1NOM}$ is approximately 250 millimeters. In some embodiments, L, $R_{1NOM}$, and $R_{2NOM}$ are selected such that the optical magnification of illumination subsystem 118 ranges from at least 4.3 to 16 or greater. In some embodiments, L, $R_{1NOM}$, and $R_{2NOM}$ are selected such that the optical magnification of illumination subsystem 118 ranges from at least 1 to 8 or greater. In some embodiments, L, $R_{1NOM}$, and $R_{2NOM}$ are selected such that the optical magnification of illumination subsystem 118 ranges from at least 2 to 5 or greater.

In some embodiments, focusing optical element 111 includes reflective surfaces that reflect x-ray photons by total external reflection.

In some embodiments, focusing optical element 111 includes reflective surfaces that reflect x-ray photons by interaction with a multilayer coating. In some of these embodiments, the multilayer coating is spatially periodic with a periodicity that changes continuously in the direction of the length of the focusing optical element. In some of these embodiments, the multilayer coating is spatially periodic with a periodicity that changes continuously in the direction of depth of the multilayer coating. In some of these embodiments the multilayer coating is spatially aperiodic in the direction of depth of the multilayer coating.

In some embodiments, focusing optical element 111 includes reflective surfaces constructed from a uniform single crystal material or a polycrystalline material with constant inter-plane distance in the longitudinal direction. In these embodiments, x-ray photons are reflected by Bragg diffraction. In some other embodiments, focusing optical element 111 includes reflective surfaces constructed from a uniform single crystal material or a polycrystalline material with continuously varying inter-plane distance in the longitudinal direction. In these embodiments, x-ray photons are reflected by Bragg diffraction.

In some embodiments, focusing optical element 111 is a one-bounce optical element having a reflective surface with the same geometrical shape such that any portion of the reflective surface has geometrical foci at the same positions with respect to the focusing optical element.

In some embodiments, focusing optical element 111 is a two-bounce optical element, e.g., Montel optics (side by side arrangement of optical surfaces), Kirkpatrick-Baez optics (serial arrangement of optical surfaces), etc. Additional description of Montel optical systems are described by M. Montel, X-ray microscopy with catamegonic roof mirrors, X-ray microscopy and microradiography, Academic Press, New York, pp. 177-185, 1957, the content of which is incorporated herein by reference in its entirety. Additional description of Kirkpatrick-Baez optical systems are described by P. Kirkpatrick and A. V. Baez, Formation of optical images by X-rays, Journal Opt. Soc. Am., vol. 38, pp. 766-774, 1948, the content of which is incorporated herein by reference in its entirety. In these embodiments, each of the optical surfaces of focusing optical element 111 tracks the same geometrical shape such that any portion of each of the reflective surfaces has geometrical foci at the same positions with respect to the focusing optical element. In some embodiments, focusing optical element 111 includes two reflecting surfaces arranged in a side-by-side configuration having an angle in the transversal direction less than 90 degrees. Furthermore, the two reflecting surfaces are configured to close the intensity gap in the beam spot measured behind the focal position wherein the gap between the reflecting surfaces is imaged. In some embodiments, the reflective surfaces of a two-bounce optical element are constructed from separate substrates attached to a common mounting frame. In some other embodiments, the reflective surfaces of a two-bounce optical element are constructed from separate substrates and each reflective surface is attached to a separate alignment stage to actively control spatial and angular mutual arrangement of the reflecting surfaces, e.g., in a side-by-side configuration.

In some embodiments, focusing optical element 111 includes two optical surfaces each having the geometrical shape of an elliptical cylinder. In some other embodiments, focusing optical element 111 includes one reflecting surface having a geometrical shape of any of an ellipsoid of revolution, a cylinder, an elliptical cylinder, a sphere, and a toroid.

In some embodiments, the x-ray illumination subsystem includes an x-ray monochromator to monochromatize the x-ray beam that is incident on the specimen 101. In one example, a crystal monochromator is employed to monochromatize the beam of x-ray radiation. In some examples, the x-ray optics collimate or focus the x-ray beam onto inspection area 102 of specimen 101 to less than 1 milliradian divergence using multilayer x-ray optics. In these examples, the multilayer x-ray optics function as a beam monochromator, also.

In some embodiments, a beam shaping slit mechanism (not shown) is located in the beam path immediately before specimen 101. The slits are located in close proximity to specimen 101 to minimize the enlargement of the incident beam spot size due to beam divergence. In some embodiments, the slits of a beam shaping slit mechanism are located within 50 millimeters of the location of incidence of illumination beam 115 with specimen 101. Exemplary beam shaping slit mechanisms are described in U.S. Patent Publication No. 2017/0307548, by Alexander Bykanov, et al., and assigned to KLA-Tencor Corporation, Milpitas, Calif. (USA), the content of which is incorporated herein by reference in its entirety.

In some other embodiments, metrology system 100 does not employ a beam shaping slit mechanism located in close proximity to specimen 101. In these embodiments, beam divergence control and illumination beam size at the surface of specimen 101 is controlled by beam selection subsystem 120. In these embodiments, effective control of photon contamination of the area around the metrology target is achieved without the use of a slit located in close proximity to the surface of the wafer under measurement.

X-ray detector 119 collects x-ray radiation 114 scattered from specimen 101 and generates an output signals 135 indicative of properties of specimen 101 that interact with the incident x-ray radiation in accordance with a T-SAXS measurement modality. In some embodiments, scattered x-rays 114 are collected by x-ray detector 119 while specimen positioning system 140 locates and orients specimen 101 to produce angularly resolved scattered x-rays.

In some embodiments, a T-SAXS system includes one or more photon counting detectors with high dynamic range (e.g., greater than $10^5$) and thick, highly absorptive crystal substrates. In some embodiments, a single photon counting detector detects the position and number of scattered photons.

In some embodiments, the x-ray detector resolves one or more x-ray photon energies and produces signals for each x-ray energy component indicative of properties of the specimen. In some embodiments, the x-ray detector 119 includes pixelated photon counting arrays, any of a CCD array, a microchannel plate, a photodiode array, a microstrip proportional counter, a gas filled proportional counter, a scintillator, or a fluorescent material.

In this manner, the X-ray photon interactions within the detector are discriminated by energy in addition to pixel location and number of counts. In some embodiments, the X-ray photon interactions are discriminated by comparing the energy of the X-ray photon interaction with a predetermined upper threshold value and a predetermined lower threshold value. In one embodiment, this information is communicated to computing system 130 via output signals 135 for further processing and storage.

In a further aspect, a T-SAXS system is employed to determine properties of a specimen (e.g., structural parameter values) based on one or more diffraction orders of scattered light. As depicted in FIG. 1, metrology tool 100 includes a computing system 130 employed to acquire signals 135 generated by detector 119 and determine properties of the specimen based at least in part on the acquired signals.

In some embodiments, measurements of the intensity of diffracted radiation as a function of x-ray incidence angle relative to the wafer surface normal are collected. Information contained in the multiple diffraction orders is typically unique between each model parameter under consideration. Thus, x-ray scattering yields estimation results for values of parameters of interest with small errors and reduced parameter correlation.

In some examples, metrology based on T-SAXS involves determining the dimensions of the sample by the inverse solution of a pre-determined measurement model with the measured data. The measurement model includes a few adjustable parameters (e.g., on the order of ten, or more) and is representative of the geometry and optical properties of the specimen and the optical properties of the measurement system. The method of inverse solve includes, but is not limited to, model based regression, tomography, machine learning, or any combination thereof. In this manner, target profile parameters are estimated by solving for values of a parameterized measurement model that minimize errors between the measured scattered x-ray intensities and modeled results.

In a further aspect, T-SAXS measurements are performed over a range of angles of incidence that provide sufficient resolution to characterize high aspect ratio structures through their entire depth.

In some embodiments, it is desirable to perform measurements at different orientations described by rotations about the Y axis of coordinate system 146 depicted in FIG. 1 and the Z' axis of coordinate system 147 attached to specimen 101. This increases the precision and accuracy of measured parameters and reduces correlations among parameters by extending the number and diversity of data sets available for analysis to include a variety of large-angle, out of plane orientations. Measuring specimen parameters with a deeper, more diverse data set also reduces correlations among parameters and improves measurement accuracy. For example, in a normal orientation, T-SAXS is able to resolve the critical dimension of a feature, but is largely insensitive to sidewall angle and height of a feature. However, by collecting measurement data over a broad range of out of plane angular positions, the sidewall angle and height of a feature can be resolved.

As illustrated in FIG. 1, metrology tool 100 includes a specimen positioning system 140 configured to both align specimen 101 and orient specimen 101 over a large range of angles of incidence with respect to the beam axis of the diffractometer. In other words, specimen positioning system 140 is configured to rotate specimen 101 over a large angular range about one or more axes of rotation aligned in-plane with the surface of specimen 101. In some embodiments, specimen positioning system 140 is configured to rotate specimen 101 within a range of at least 60 degrees about one or more axes of rotation aligned in-plane with the surface of specimen 101. In this manner, angle resolved measurements of specimen 101 are collected by metrology system 100 over any number of locations on the surface of specimen 101. In one example, computing system 130 communicates command signals to a motion controller of specimen positioning system 140 that indicate the desired position of specimen 101. In response, the motion controller generates command signals to the various actuators of specimen positioning system 140 to achieve the desired positioning of specimen 101.

In general, specimen positioning system 140 may include any suitable combination of mechanical elements to achieve the desired linear and angular positioning performance, including, but not limited to goniometer stages, hexapod stages, angular stages, and linear stages.

Figure 5:
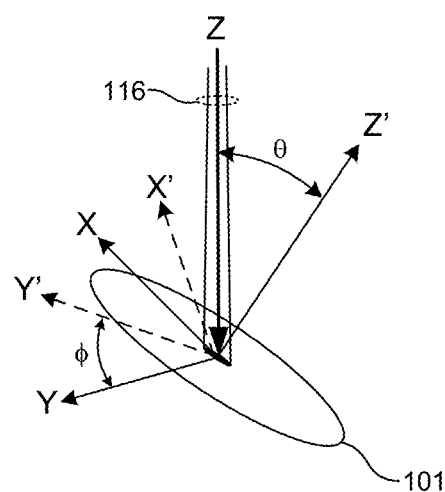
FIG. 5 depicts a specimen 101 oriented with respect to an incident x-ray illumination beam 116 at a particular orientation described by angles ϕ and θ.

As described herein, T-SAXS measurements are performed at multiple orientations of the illuminating x-ray beam relative to the surface normal of the semiconductor wafer. Each orientation is described by any two angular rotations of wafer 101 with respect to the x-ray illumination beam, or vice-versa. In one example, the orientation can be described with respect to the central axis of the x-ray illumination beam 116 incident on specimen 101. FIG. 5 depicts x-ray illumination beam 116 incident on wafer 101 at a particular orientation described by angles $\phi$ and $\theta$. Coordinate frame XYZ is fixed to the x-ray illumination beam 116 such that the Z-axis is aligned with the central axis of x-ray illumination beam 116. Coordinate frame X'Y'Z' is fixed to wafer 101. The Y-axis is aligned in plane with the surface of wafer 101 and the wafer rotates about the Y-axis by the angle, $\theta$. The Z'-axis is normal to the surface of wafer 101, and X' and Y' are in plane with the surface of wafer 101. Angle, $\phi$, describes the orientation of the Y'-axis with respect to the Y-axis. Together, $\theta$ and $\phi$, uniquely define the orientation of the surface of specimen 101 with respect to x-ray illumination beam 116. In this example, the orientation of the surface of specimen 101 with respect to x-ray illumination beam 116 is described by a rotation about an axis normal to the surface of specimen 101 (i.e., Z' axis) and a rotation about an axis aligned with the surface of wafer 101 (i.e., Y axis).

The illumination beam spot size on specimen 101 is proportional to optical magnification. Thus, as magnification is adjusted to a desired value, the illumination beam spot size at the surface of specimen 101 changes. In many measurement applications this allows control of the illumination beam spot size to minimize signal contamination due to illumination spillover onto structures surrounding the metrology target of interest while keeping the highest possible photon flux.

In a further aspect, the illumination spot size and shape is controlled by variation of the source size and shape, respectively. In some embodiments, the illumination source size is controlled to maintain constant illumination beam spot size at the specimen over a wide range of optical magnifications. In some other embodiments, the illumination source size is controlled to adjust the illumination beam spot size at the specimen to match a desired measurement area associated with a particular metrology target.

This enables metrology system 100 to form an illumination beam 115 having an illumination beam spot size that is scaled to the size of each different metrology target under measurement and effectively controls photon contamination around the metrology target without the use of beam shaping slits located in close proximity to the metrology target under measurement.

In some embodiments, the size of illumination source 110 is adjustable by a factor of two without considerable loss of brightness. In some embodiments, a liquid metal jet (LMJ) x-ray illumination source size is controlled to generate illumination over a round area of 10 micrometers full width half maximum (FWHM) and also an elliptical area of 20 micrometers by 10 micrometers FWHM, while maintaining brightness at the same level. For an LMJ illumination source, the x-ray illumination source size is proportional to the electron beam size across the LMJ anode in the transversal direction. Thus, the x-ray illumination source size is controlled by adjusting the size of the electron beam at incidence with the LMJ anode.

In one example, metrology system 100 is configured with a round illumination source size of 10 micrometers full width half maximum (FWHM). Computing system communicates control commands 136 to actuators 121A and 121B to locate blade elements 122A and 122B, respectively, such that the magnification of illumination subsystem 118 is approximately five. In this configuration, metrology system 100 measures a 100 micrometer by 100 micrometer metrology target over a range of angles of incidence, $\theta$, and a range of azimuth angles, $\phi$. In another example, the same metrology system 100 (i.e., same optical components in same locations) is configured with an elliptical illumination source of 10 micrometers by 20 micrometer FWHM. Computing system communicates control commands 136 to actuators 121A and 121B to locate blade elements 122A and 122B, respectively, such that the magnification of illumination subsystem 118 is approximately 2.5. In this configuration, metrology system 100 measures a 50 micrometer by 100 micrometer metrology target over a range of angles of incidence, $\theta$. In this example, divergence is effectively controlled in one direction (50 micrometer direction) and a maximum number of photons are collected in the other direction (100 micrometer direction). The illumination beam spot size is matched to the metrology target by reshaping the illumination spot and changing magnification.

In some examples, computing system 130 communicates control commands 137 to illumination source 110. In response, illumination source 110 adjusts spot size and shape, illumination power, spot offsets, incident angles, etc. In one example, the parameters of the electron beam incident on the source target are adjusted to change the spot size and shape, illumination power, spot offsets, incident angles, etc.

Slits are constructed from materials that minimize scattering and effectively block incident radiation. Exemplary materials include single crystal materials such as Germanium, Gallium Arsenide, Indium Phosphide, etc. The slit material is cleaved along crystalline plans, rather than sawn, to minimize scattering across structural boundaries. In addition, the slit is oriented with respect to the incoming beam such that the interaction between the incoming radiation and the internal structure of the slit material produces a minimum amount of scattering. The crystal material is attached to blades made of high density material (e.g., tungsten) for complete blocking of the x-ray beam on one side of the slit.

In some embodiments, x-ray illumination source 110, focusing optical element 111, beam selection subsystem 120, or any combination thereof, are maintained in the same atmospheric environment as specimen 101 (e.g., gas purge environment). However, in some embodiments, the optical path between and within any of these elements is long and x-ray scattering in air contributes noise to the image on the detector. Hence in some embodiments, any of x-ray illumination source 110, focusing optical element 111, beam selection subsystem 120 are maintained in one or more localized, vacuum environments separated from the specimen (e.g., specimen 101) by one or more vacuum windows.

Similarly, in some embodiments, x-ray detector 119 is maintained in the same atmospheric environment as specimen 101 (e.g., gas purge environment). However, in some embodiments, the distance between specimen 101 and x-ray detector 119 is lengthy and X-ray scattering in air contributes noise to the detected signals. Hence, in some embodiments, one or more of the x-ray detectors is maintained in a localized, vacuum environment separated from the specimen (e.g., specimen 101) by a vacuum window.

Vacuum windows may be constructed of any suitable material that is substantially transparent to x-ray radiation (e.g., Kapton, Beryllium, etc.). A suitable vacuum environment is maintained within each vacuum chamber to minimize scattering of the illumination beam. A suitable vacuum environment may include any suitable level of vacuum, any suitable purged environment including a gas with a small atomic number (e.g., helium), or any combination thereof. In this manner, as much of the beam path as possible is located in vacuum to maximize flux and minimize scattering.

In some embodiments, the entire optical system, including specimen 101, is maintained in vacuum. However, in general, the costs associated with maintaining specimen 101 in vacuum are high due to the complexities associated with the construction of specimen positioning system 140.

In another further aspect, computing system 130 is configured to generate a structural model (e.g., geometric model, material model, or combined geometric and material model) of a measured structure of a specimen, generate a T-SAXS response model that includes at least one geometric parameter from the structural model, and resolve at least one specimen parameter value by performing a fitting analysis of T-SAXS measurement data with the T-SAXS response model. The analysis engine is used to compare the simulated T-SAXS signals with measured data thereby allowing the determination of geometric as well as material properties such as electron density of the sample. In the embodiment depicted in FIG. 1, computing system 130 is configured as a model building and analysis engine configured to implement model building and analysis functionality as described herein.

Figure 6:
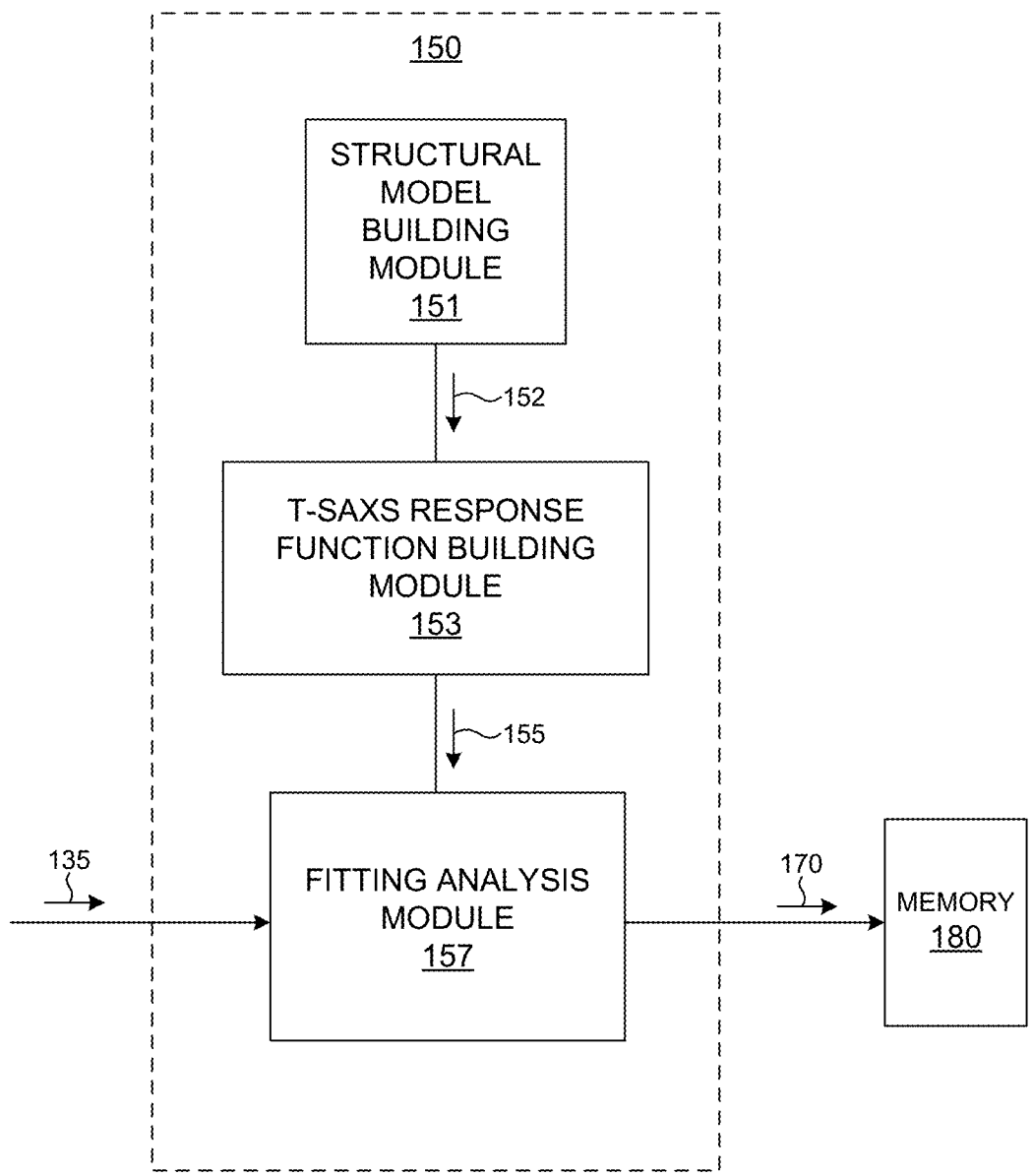
FIG. 6 is a diagram illustrative of a model building and analysis engine 150 configured to resolve specimen parameter values based on T-SAXS data in accordance with the methods described herein.

FIG. 6 is a diagram illustrative of an exemplary model building and analysis engine 150 implemented by computing system 130. As depicted in FIG. 6, model building and analysis engine 150 includes a structural model building module 151 that generates a structural model 152 of a measured structure of a specimen. In some embodiments, structural model 152 also includes material properties of the specimen. The structural model 152 is received as input to T-SAXS response function building module 153. T-SAXS response function building module 153 generates a T-SAXS response function model 155 based at least in part on the structural model 152. In some examples, the T-SAXS response function model 155 is based on x-ray form factors, $$F(\vec{q}) = \int \rho(\vec{r}) e^{-i\vec{q} \cdot \vec{r}} d\vec{r} \quad (4)$$

where F is the form factor, q is the scattering vector, and ρ(r) is the electron density of the specimen in spherical coordinates. The x-ray scattering intensity is then given by $$I(\vec{q}) = F^*F. \quad (5)$$

T-SAXS response function model 155 is received as input to fitting analysis module 157. The fitting analysis module 157 compares the modeled T-SAXS response with the corresponding measured data to determine geometric as well as material properties of the specimen.

In some examples, the fitting of modeled data to experimental data is achieved by minimizing a chi-squared value. For example, for T-SAXS measurements, a chi-squared value can be defined as $$\chi^2_{SAXS} = \frac{1}{N_{SAXS}} \sum_j^{N_{SAXS}} \frac{(S_j^{SAXS\ model}(v_1, \ldots, v_L) - S_j^{SAXS\ experiment})^2}{\sigma^2_{SAXS,j}} \quad (6)$$

Where, $S_j^{SAXS\ experiment}$ is the measured T-SAXS signals 126 in the "channel" j, where the index j describes a set of system parameters such as diffraction order, energy, angular coordinate, etc. $S_j^{SAXS\ model}(v_1, \ldots, v_L)$ is the modeled T-SAXS signal $S_j$ for the "channel" j, evaluated for a set of structure (target) parameters $v_1, \ldots, v_L$, where these parameters describe geometric (CD, sidewall angle, overlay, etc.) and material (electron density, etc.). $\sigma_{SAXS,j}$ is the uncertainty associated with the jth channel. $N_{SAXS}$ is the total number of channels in the x-ray metrology. L is the number of parameters characterizing the metrology target.

Equation (6) assumes that the uncertainties associated with different channels are uncorrelated. In examples where the uncertainties associated with the different channels are correlated, a covariance between the uncertainties, can be calculated. In these examples a chi-squared value for T-SAXS measurements can be expressed as $$\chi^2_{SAXS} = \frac{1}{N_{SAXS}} (\vec{S}_j^{SAXS.\ model}(v_1, \ldots, v_M) - \vec{S}_j^{SAXS.\ experiment})^T \quad (7)$$
$$V_{SAXS}^{-1} (\vec{S}_j^{SAXS.\ model}(v_1, \ldots, v_M) - \vec{S}_j^{SAXS.\ experiment})$$

where, $V_{SAXS}$ is the covariance matrix of the SAXS channel uncertainties, and T denotes the transpose.

In some examples, fitting analysis module 157 resolves at least one specimen parameter value by performing a fitting analysis on T-SAXS measurement data 135 with the T-SAXS response model 155. In some examples, $\chi^2_{SAXS}$ is optimized.

As described hereinbefore, the fitting of T-SAXS data is achieved by minimization of chi-squared values. However, in general, the fitting of T-SAXS data may be achieved by other functions.

The fitting of T-SAXS metrology data is advantageous for any type of T-SAXS technology that provides sensitivity to geometric and/or material parameters of interest. Specimen parameters can be deterministic (e.g., CD, SWA, etc.) or statistical (e.g., rms height of sidewall roughness, roughness correlation length, etc.) as long as proper models describing T-SAXS beam interaction with the specimen are used.

In general, computing system 130 is configured to access model parameters in real-time, employing Real Time Critical Dimensioning (RTCD), or it may access libraries of pre-computed models for determining a value of at least one specimen parameter value associated with the specimen 101. In general, some form of CD-engine may be used to evaluate the difference between assigned CD parameters of a specimen and CD parameters associated with the measured specimen. Exemplary methods and systems for computing specimen parameter values are described in U.S. Pat. No. 7,826,071, issued on Nov. 2, 2010, to KLA-Tencor Corp., the entirety of which is incorporated herein by reference.

In some examples, model building and analysis engine 150 improves the accuracy of measured parameters by any combination of feed sideways analysis, feed forward analysis, and parallel analysis. Feed sideways analysis refers to taking multiple data sets on different areas of the same specimen and passing common parameters determined from the first dataset onto the second dataset for analysis. Feed forward analysis refers to taking data sets on different specimens and passing common parameters forward to subsequent analyses using a stepwise copy exact parameter feed forward approach. Parallel analysis refers to the parallel or concurrent application of a non-linear fitting methodology to multiple datasets where at least one common parameter is coupled during the fitting.

Multiple tool and structure analysis refers to a feed forward, feed sideways, or parallel analysis based on regression, a look-up table (i.e., "library" matching), or another fitting procedure of multiple datasets. Exemplary methods and systems for multiple tool and structure analysis is described in U.S. Pat. No. 7,478,019, issued on Jan. 13, 2009, to KLA-Tencor Corp., the entirety of which is incorporated herein by reference.

In another further aspect, an initial estimate of values of one or more parameters of interest is determined based on T-SAXS measurements performed at a single orientation of the incident x-ray beam with respect to the measurement target. The initial, estimated values are implemented as the starting values of the parameters of interest for a regression of the measurement model with measurement data collected from T-SAXS measurements at multiple orientations. In this manner, a close estimate of a parameter of interest is determined with a relatively small amount of computational effort, and by implementing this close estimate as the starting point for a regression over a much larger data set, a refined estimate of the parameter of interest is obtained with less overall computational effort.

In another aspect, metrology tool 100 includes a computing system (e.g., computing system 130) configured to implement beam control functionality as described herein. In the embodiment depicted in FIG. 1, computing system 130 is configured as a beam controller operable to control any of the illumination properties such as intensity, divergence, spot size, polarization, spectrum, and positioning of the incident illumination beam 115.

As illustrated in FIG. 1, computing system 130 is communicatively coupled to detector 119. Computing system 130 is configured to receive measurement data 135 from detector 119. In one example, measurement data 135 includes an indication of the measured response of the specimen (i.e., intensities of the diffraction orders). Based on the distribution of the measured response on the surface of detector 119, the location and area of incidence of illumination beam 115 on specimen 101 is determined by computing system 130. In one example, pattern recognition techniques are applied by computing system 130 to determine the location and area of incidence of illumination beam 115 on specimen 101 based on measurement data 135. In some examples, computing system 130 communicates command signals 137 to x-ray illumination source 110 to select the desired size and shape of illumination source, illumination wavelength, or redirect the x-ray emission. In some examples, computing system 130 communicates command signals 136 to beam selection subsystem 120 to change the beam spot size such that incident illumination beam 115 arrives at specimen 101 with the desired beam spot size and orientation. In one example, command signals 136 cause beam selection subsystem 120 to independently adjust the magnification of illumination subsystem 118 and the divergence of illumination beam 115. In some other examples, computing system 130 communicates a command signal to wafer positioning system 140 to position and orient specimen 101 such that incident illumination beam 115 arrives at the desired location and angular orientation with respect to specimen 101.

In a further aspect, T-SAXS measurement data is used to generate an image of a measured structure based on the measured intensities of the detected diffraction orders. In some embodiments, a T-SAXS response function model is generalized to describe the scattering from a generic electron density mesh. Matching this model to the measured signals, while constraining the modelled electron densities in this mesh to enforce continuity and sparse edges, provides a three dimensional image of the sample.

Although, geometric, model-based, parametric inversion is preferred for critical dimension (CD) metrology based on T-SAXS measurements, a map of the specimen generated from the same T-SAXS measurement data is useful to identify and correct model errors when the measured specimen deviates from the assumptions of the geometric model.

In some examples, the image is compared to structural characteristics estimated by a geometric, model-based parametric inversion of the same scatterometry measurement data. Discrepancies are used to update the geometric model of the measured structure and improve measurement performance. The ability to converge on an accurate parametric measurement model is particularly important when measuring integrated circuits to control, monitor, and trouble-shoot their manufacturing process.

In some examples, the image is a two dimensional (2-D) map of electron density, absorptivity, complex index of refraction, or a combination of these material characteristics. In some examples, the image is a three dimensional (3-D) map of electron density, absorptivity, complex index of refraction, or a combination of these material characteristics. The map is generated using relatively few physical constraints. In some examples, one or more parameters of interest, such as critical dimension (CD), sidewall angle (SWA), overlay, edge placement error, pitch walk, etc., are estimated directly from the resulting map. In some other examples, the map is useful for debugging the wafer process when the sample geometry or materials deviate outside the range of expected values contemplated by a parametric structural model employed for model-based CD measurement. In one example, the differences between the map and a rendering of the structure predicted by the parametric structural model according to its measured parameters are used to update the parametric structural model and improve its measurement performance. Further details are described in U.S. Patent Publication No. 2015/0300965, the content of which is incorporated herein by reference it its entirety. Additional details are described in U.S. Patent Publication No. 2015/0117610, the content of which is incorporated herein by reference it its entirety.

In a further aspect, model building and analysis engine 150 is employed to generate models for combined x-ray and optical measurement analysis. In some examples, optical simulations are based on, e.g., rigorous coupled-wave analysis (RCWA) where Maxwell's equations are solved to calculate optical signals such as reflectivities for different polarizations, ellipsometric parameters, phase change, etc.

Values of one or more parameters of interest are determined based on a combined fitting analysis of the detected intensities of the x-ray diffraction orders at the plurality of different angles of incidence and detected optical intensities with a combined, geometrically parameterized response model. The optical intensities are measured by an optical metrology tool that may or may not be mechanically integrated with an x-ray metrology system, such as systems 100 depicted in FIG. 1. Further details are described in U.S. Patent Publication No. 2014/0019097 and U.S. Patent Publication No. 2013/0304424, the contents of each are incorporated herein by reference it their entirety.

In general, a metrology target is characterized by an aspect ratio defined as a maximum height dimension (i.e., dimension normal to the wafer surface) divided by a maximum lateral extent dimension (i.e., dimension aligned with the wafer surface) of the metrology target. In some embodiments, the metrology target under measurement has an aspect ratio of at least twenty. In some embodiments, the metrology target has an aspect ratio of at least forty.

It should be recognized that the various steps described throughout the present disclosure may be carried out by a single computer system 130 or, alternatively, a multiple computer system 130. Moreover, different subsystems of the system 100, such as beam selection subsystem 120, illumination source 110, specimen positioning system 140, etc., may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the x-ray illumination source 110, beam selection subsystem 120, specimen positioning system 140, and detector 119 in any manner known in the art. For example, the one or more computing systems 130 may be coupled to computing systems associated with the x-ray illumination source 110, beam selection subsystem 120, specimen positioning system 140, and detector 119, respectively. In another example, any of the x-ray illumination source 110, beam selection subsystem 120, specimen positioning system 140, and detector 119 may be controlled directly by a single computer system coupled to computer system 130.

The computer system 130 may be configured to receive and/or acquire data or information from the subsystems of the system (e.g., x-ray illumination source 110, beam selection subsystem 120, specimen positioning system 140, detector 119, and the like) by a transmission medium that may include wireline and/or wireless portions. In this manner, the transmission medium may serve as a data link between the computer system 130 and other subsystems of the system 100.

Computer system 130 of the metrology system 100 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, or external systems). For example, the computing system 130 may be configured to receive measurement data (e.g., signals 135) from a storage medium (i.e., memory 132 or 180) via a data link. For instance, results obtained using detector 119 may be stored in a permanent or semi-permanent memory device (e.g., memory 132 or 180). In this regard, the measurement results may be imported from on-board memory or from an external memory system. Moreover, the computer system 130 may send data to other systems via a transmission medium. For instance, specimen parameter values 170 determined by computer system 130 may be stored in a permanent or semi-permanent memory device (e.g., memory 180). In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some embodiments, a scatterometry analysis as described herein is implemented as part of a fabrication process tool. Examples of fabrication process tools include, but are not limited to, lithographic exposure tools, film deposition tools, implant tools, and etch tools. In this manner, the results of a T-SAXS analysis are used to control a fabrication process. In one example, T-SAXS measurement data collected from one or more targets is sent to a fabrication process tool. The T-SAXS measurement data is analyzed as described herein and the results used to adjust the operation of the fabrication process tool.

Scatterometry measurements as described herein may be used to determine characteristics of a variety of semiconductor structures. Exemplary structures include, but are not limited to, FinFETs, low-dimensional structures such as nanowires or graphene, sub 10 nm structures, lithographic structures, through substrate vias (TSVs), memory structures such as DRAM, DRAM 4F2, FLASH, MRAM and high aspect ratio memory structures. Exemplary structural characteristics include, but are not limited to, geometric parameters such as line edge roughness, line width roughness, pore size, pore density, side wall angle, profile, critical dimension, pitch, thickness, overlay, and material parameters such as electron density, composition, grain structure, morphology, stress, strain, and elemental identification. In some embodiments, the metrology target is a periodic structure. In some other embodiments, the metrology target is aperiodic.

In some examples, measurements of critical dimensions, thicknesses, overlay, and material properties of high aspect ratio semiconductor structures including, but not limited to, spin transfer torque random access memory (STT-RAM), three dimensional NAND memory (3D-NAND) or vertical NAND memory (V-NAND), dynamic random access memory (DRAM), three dimensional FLASH memory (3D-FLASH), resistive random access memory (Re-RAM), and phase change random access memory (PC-RAM) are performed with T-SAXS measurement systems as described herein.

Figure 7:
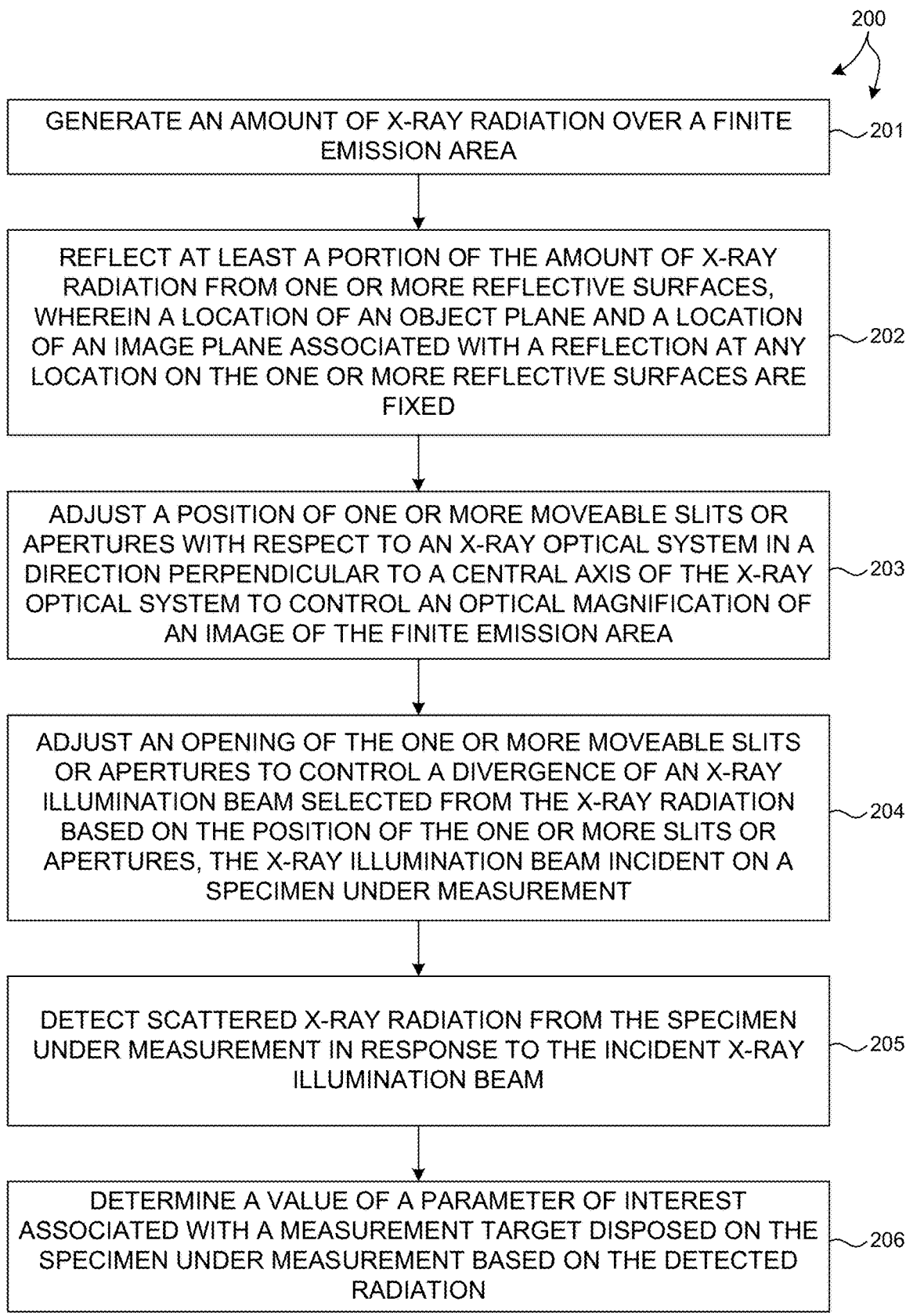
FIG. 7 depicts a flowchart illustrative of an exemplary method 200 of measuring structures based on T-SAXS measurements as described herein.

FIG. 7 illustrates a method 200 suitable for implementation by the metrology system 100 of the present invention. In one aspect, it is recognized that data processing blocks of method 200 may be carried out via a pre-programmed algorithm executed by one or more processors of computing system 130. While the following description is presented in the context of metrology system 100, it is recognized herein that the particular structural aspects of metrology system 100 do not represent limitations and should be interpreted as illustrative only.

In block 201, an amount of x-ray radiation is generated over a finite emission area.

In block 202, at least a portion of the amount of x-ray radiation is reflected from one or more reflective surfaces. A location of an object plane and a location of an image plane associated with the reflection at any location on the one or more reflective surfaces are fixed.

In block 203, a position of one or more moveable slits or apertures is adjusted with respect to an x-ray optical system in a direction perpendicular to a central axis of the x-ray optical system to control an optical magnification of an image of the finite emission area.

In block 204, an opening of the one or more moveable slits or apertures is adjusted to control a divergence of an x-ray illumination beam selected from the x-ray radiation based on the position of the one or more slits or apertures. The x-ray illumination beam is incident on a specimen under measurement.

In block 205, scattered x-ray radiation from the specimen under measurement in response to the incident x-ray illumination beam is detected.

In block 206, a value of a parameter of interest associated with a measurement target disposed on the specimen under measurement is determined based on the detected x-ray radiation.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including critical dimension applications and overlay metrology applications. However, such terms of art do not limit the scope of the term "metrology system" as described herein. In addition, the metrology systems described herein may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the measurement techniques described herein.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, XRF disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A metrology system comprising:
   an illumination subsystem including:
      an x-ray illumination source configured to generate x-ray radiation, the x-ray illumination source having a finite emission area;
      a focusing optical element having one or more reflective surfaces, wherein a location of an object plane and a location of an image plane associated with a reflection at any location on the one or more reflective surfaces are fixed; and
      a beam selection subsystem including one or more moveable slits or apertures located in a beam path between the x-ray illumination source and a specimen under measurement, wherein a position of the one or more moveable slits or apertures with respect to the x-ray radiation in a direction perpendicular to a central axis of the illumination subsystem controls an optical magnification of the illumination subsystem, and wherein an opening of the one or more moveable slits or apertures controls a divergence of an x-ray illumination beam reflected from the focusing optical element and selected from the x-ray radiation based on the position of the one or more slits or apertures, the x-ray illumination beam incident on the specimen under measurement; and
   an x-ray detector configured to detect an intensity associated with an amount of radiation scattered from the specimen under measurement in response to the incident x-ray illumination beam.

2. The metrology system of claim 1, wherein a shape and size of the finite emission area of the x-ray illumination source is adjustable.

3. The metrology system of claim 2, further comprising:
   a computing system configured to:
      communicate a first command signal to the beam selection subsystem that causes at least one actuator to move the one or more moveable slits or apertures with respect to the x-ray radiation in the direction perpendicular to the central axis of the illumination subsystem to a desired position that corresponds to a desired magnification of the illumination subsystem and to adjust the opening of the one or more slits or apertures to a desired opening that corresponds to a desired divergence of the incident x-ray illumination beam; and
      communicate a second command signal to the illumination source that causes the illumination source to change a size, shape, or both size and shape of the finite emission area.

4. The metrology system of claim 3, wherein the second command signal also causes the illumination source to adjust a power of an electron beam that generates the x-ray radiation.

5. The metrology system of claim 4, wherein the changing of the size, shape, or both size and shape of the finite emission area and the adjustment of the power of the electron beam maximizes the generated x-ray flux such that a maximum allowable area of the specimen illuminated by the incident x-ray illumination beam is used.

6. The metrology system of claim 3, wherein the desired size and shape of the area of the specimen illuminated by the incident x-ray illumination beam is circular or elliptical.

7. The metrology system of claim 1, wherein the beam selection subsystem is located in an optical path of the x-ray illumination beam between the illumination source and the focusing optical element, an optical path of the x-ray illumination beam between the focusing optical element and the specimen, or a combination thereof.

8. The metrology system of claim 1, further comprising:
a specimen positioning system configured to position the specimen under measurement with respect to the incident x-ray illumination beam at a plurality of angles of incidence, wherein the plurality of angles of incidence range between normal incidence to at least twenty degrees from normal incidence.

9. The metrology system of claim 1, wherein the focusing optical element is elliptically shaped.

10. The metrology system of claim 1, wherein a distance between the illumination source and the one or more reflective surfaces is at least 50 millimeters.

11. The metrology system of claim 1, wherein the optical magnification of illumination subsystem ranges from at least 2 to 5 or greater.

12. An x-ray illumination subsystem, comprising:
an x-ray illumination source configured to generate an amount of x-ray radiation, wherein a shape and size of a finite emission area of the x-ray illumination source is adjustable;
a focusing optical element having one or more reflective surfaces, wherein a location of an object plane and a location of an image plane associated with a reflection at any location on one or more reflective surfaces are fixed; and
a beam selection subsystem including one or more moveable slits or apertures located in a beam path between the x-ray illumination source and a specimen under measurement, wherein a position of the one or more moveable slits or apertures with respect to the x-ray radiation in a direction perpendicular to a central axis of the x-ray illumination subsystem controls an optical magnification of the illumination subsystem, and wherein an opening of the one or more moveable slits or apertures controls a divergence of an x-ray illumination beam reflected from the focusing optical element and selected from the reflected x-ray radiation based on the position of the one or more slits or apertures, the x-ray illumination beam incident on the specimen under measurement.

13. The x-ray illumination subsystem of claim 12, further comprising:
a computing system configured to:
communicate a first command signal to the beam selection subsystem that causes at least one actuator to move the one or more moveable slits or apertures with respect to the x-ray radiation in the direction perpendicular to the central axis of the x-ray illumination subsystem to a desired position that corresponds to a desired magnification of the illumination subsystem and to adjust the opening of the one or more slits or apertures to a desired opening that corresponds to a desired divergence of the incident x-ray illumination beam; and
communicate a second command signal to the illumination source that causes the illumination source to change a size, shape, or both size and shape of the finite emission area.

14. The x-ray illumination subsystem of claim 13, wherein the second command signal also causes the illumination source to adjust a power of an electron beam that generates the x-ray radiation.

15. The x-ray illumination subsystem of claim 14, wherein the changing of the size, shape, or both size and shape of the finite emission area and the adjustment of the power of the electron beam maximizes the generated x-ray flux such that a maximum allowable area of the specimen illuminated by the incident x-ray illumination beam is used.

16. The x-ray illumination subsystem of claim 12, wherein the beam selection subsystem is located in an optical path of the x-ray illumination beam between the illumination source and the focusing optical element, an optical path of the x-ray illumination beam between the focusing optical element and the specimen, or a combination thereof.

17. The x-ray illumination subsystem of claim 12, wherein the focusing optical element is elliptically shaped.

18. The x-ray illumination subsystem of claim 12, wherein a distance between the illumination source and the one or more reflective surfaces is at least 50 millimeters.

19. The x-ray illumination subsystem of claim 12, wherein the optical magnification of illumination subsystem ranges from at least 2 to 5 or greater.

20. A method comprising:
generating an amount of x-ray radiation over a finite emission area;
reflecting at least a portion of the generated x-ray radiation from one or more reflective surfaces, wherein a location of an object plane and a location of an image plane associated with a reflection at any location on the one or more reflective surfaces are fixed; and
adjusting a position of one or more moveable slits or apertures with respect to an x-ray optical system in a direction perpendicular to a central axis of the x-ray optical system to control an optical magnification of an image of the finite emission area;
adjusting an opening of the one or more moveable slits or apertures to control a divergence of an x-ray illumination beam selected from the x-ray radiation based on the position of the one or more slits or apertures, the x-ray illumination beam incident on a specimen under measurement;
detecting scattered x-ray radiation from the specimen under measurement in response to the incident x-ray illumination beam; and
determining a value of a parameter of interest associated with a measurement target disposed on the specimen under measurement based on the detected x-ray radiation.

21. The method of claim 20, further comprising:
adjusting a shape of the finite emission area, a size of the finite emission area, or both.

22. The method of claim 21, further comprising:
adjusting a power of an electron beam that generates the x-ray radiation.

23. The method of claim 22, wherein the changing of the size, shape, or both size and shape of the finite emission area and the adjusting of the power of the electron beam maximizes the generated x-ray flux such that a maximum allowable area of the specimen illuminated by the incident x-ray illumination beam is used.

24. The method of claim 20, wherein the one or more reflective surfaces include a geometrical shape of any of an ellipsoid of revolution, a cylinder, an elliptical cylinder, a sphere, and a toroid.

25. The method of claim 20, further comprising:
positioning the specimen under measurement with respect to the incident beam of x-ray radiation at a plurality of angles of incidence, wherein the plurality of angles of incidence range between normal incidence to at least twenty degrees from normal incidence.

* * * * *